(12) United States Patent
van Welzen et al.

(10) Patent No.: US 8,320,749 B1
(45) Date of Patent: *Nov. 27, 2012

(54) METHOD AND SYSTEM FOR DVD SMOOTH SEARCH TRANSITIONS

(75) Inventors: James Lewis van Welzen, Longmont, CO (US); Brian Dennis Falardeau, Boulder, CO (US); Jonathan Barton White, Fort Collins, CO (US)

(73) Assignee: NVIDIA Corporation, Santa Clara, CA (US)

( * ) Notice: Subject to any disclaimer, the term of this patent is extended or adjusted under 35 U.S.C. 154(b) by 1418 days.

This patent is subject to a terminal disclaimer.

(21) Appl. No.: 11/805,363

(22) Filed: May 22, 2007

Related U.S. Application Data

(63) Continuation of application No. 09/994,428, filed on Nov. 26, 2001, now Pat. No. 7,221,851.

(51) Int. Cl.
*H04N 5/783* (2006.01)
(52) U.S. Cl. .......................... 386/347; 306/343; 306/344
(58) Field of Classification Search .................. None
See application file for complete search history.

(56) References Cited

U.S. PATENT DOCUMENTS

| | | | |
|---|---|---|---|
| 4,579,934 A | 4/1986 | Brinkmeyer et al. |
| 5,377,051 A | 12/1994 | Lane et al. |
| 5,502,570 A | 3/1996 | Shikakura et al. |
| 5,771,331 A | 6/1998 | Aoki et al. |
| 5,799,129 A | 8/1998 | Muto |
| 5,880,786 A | 3/1999 | Oku |
| 5,974,224 A | 10/1999 | Nagata |
| 5,999,698 A | 12/1999 | Nakai et al. |
| 6,004,243 A | 12/1999 | Ewert |
| 6,009,231 A | 12/1999 | Aoki et al. |
| 6,031,960 A | 2/2000 | Lane |
| 6,081,299 A | 6/2000 | Kesselring |
| 6,353,700 B1 | 3/2002 | Zhou |
| 6,473,558 B1 | 10/2002 | Wu et al. |
| 6,532,232 B1 | 3/2003 | Goodwin, III |
| 6,621,979 B1 * | 9/2003 | Eerenberg et al. ............ 386/346 |
| 6,952,521 B2 | 10/2005 | Kelly et al. |
| 6,970,640 B2 | 11/2005 | Green et al. |

(Continued)

FOREIGN PATENT DOCUMENTS

EP 0674445 9/1995

(Continued)

OTHER PUBLICATIONS

"Short Glossary of DVD Terminology" RCA User's Manual, No. RC5200P, 1996, pp. 4-48, XP002968378.

(Continued)

*Primary Examiner* — William C Vaughn, Jr.
*Assistant Examiner* — Heather Jones

(57) ABSTRACT

Methods, systems and computer-readable medium for changing video playback speed are disclosed. Video playback speed may be changed by determining a first frame rate and a second frame rate for which a frame rate transition is to be made. An instantaneous frame rate is calculated to produce a calculated instantaneous frame rate, wherein the calculated instantaneous frame rate is between the first frame rate and the second frame rate. A timestamp of a frame is adjusted based on the calculated instantaneous frame rate to produce an adjusted timestamp. Graphical data for the frame is provided in accordance with the adjusted timestamp to enable display of the frame. Thereafter, the frame may be displayed in accordance with the adjusted timestamp.

20 Claims, 5 Drawing Sheets

| | | | | | | | | | | |
|---|---|---|---|---|---|---|---|---|---|---|
| 1) | | | | | I12 | | | | | |
| 2) | | | | | I12 | P15 | | | | |
| 3) | | | | | I12 | P15 | P18 | | | |
| 4) | | | | | I12 | P15 | P18 | P21 | | |
| 5) | | | | | I12 | P15 | P18 | P21 | | I24 |
| 6) | | | | | I12 | P15 | P18 | P21 | B23 | I24 |
| 7) | | | | | I12 | P15 | P18 | P21 | B22 | B23 | I24 |
| 8) | I0 | | | | I12 | P15 | P18 | P21 | B22 | B23 | I24 |
| 9) | I0 | | | | I12 | P15 | P18 | B20 | P21 | B22 |
| 10) | I0 | | | | I12 | P15 | P18 | B19 | B20 | P21 |
| 11) | I0 | P3 | | | I12 | P15 | P18 | B19 | B20 | P21 |
| 12) | I0 | P3 | | | I12 | P15 | B17 | P18 | B19 |
| 13) | I0 | P3 | | | I12 | P15 | B16 | B17 | P18 |
| 14) | I0 | P3 | P6 | | I12 | P15 | B16 | B17 | P18 |
| 15) | I0 | P3 | P6 | | I12 | B14 | P15 | B16 |
| 16) | I0 | P3 | P6 | | I12 | B13 | B14 | P15 |
| 17) | I0 | P3 | P6 | P9 | I12 | B13 | B14 | P15 |
| 18) | I0 | P3 | P6 | P9 | B11 | I12 | B13 |

U.S. PATENT DOCUMENTS

| | | | |
|---|---|---|---|
| 6,980,552 B1 | 12/2005 | Belz et al. | |
| 7,003,597 B2 | 2/2006 | Georgiou et al. | |
| 7,221,851 B1 * | 5/2007 | van Welzen et al. | 386/346 |
| 7,231,138 B1 | 6/2007 | van Welzen et al. | |

FOREIGN PATENT DOCUMENTS

| | | |
|---|---|---|
| EP | 0725399 | 8/1996 |

OTHER PUBLICATIONS

Boiston Alan: "PlayStation2: DVD Or Not to Be?" Internet Citation, May 8, 2000, XP002968377.

Application as Filed; U.S. Appl. No. 09/994,429, Filed Nov. 26, 2001; James Lewis van Welzen.

* cited by examiner

FIG. 2

| I0 | B1 | B2 | P3 | B4 | B5 | P6 | B7 | B8 | P9 | B10 | B11 | I12 | B13 | B14 | P15 | B16 | B17 | P18 | B19 | B20 | P21 | B22 | B23 | I24 |
|---|---|---|---|---|---|---|---|---|---|---|---|---|---|---|---|---|---|---|---|---|---|---|---|---|

FIG. 4

| # | I0 | B1 | B2 | P3 | B4 | B5 | P6 | B7 | B8 | P9 | B10 | B11 | I12 | B13 | B14 | P15 | B16 | B17 | P18 | B19 | B20 | P21 | B22 | B23 | I24 |
|---|---|---|---|---|---|---|---|---|---|---|---|---|---|---|---|---|---|---|---|---|---|---|---|---|---|
| 1) | *I0* | | | | | | | | | | | | | | | | | | | | | | | | |
| 2) | I0 | | | | | | | | | | | | | | | | | | | | | | | | |
| 3) | I0 | | | *P3* | | | | | | | | | | | | | | | | | | | | | |
| 4) | I0 | | | P3 | | | | | | | | | | | | | | | | | | | | | |
| 5) | I0 | | | P3 | | | | | | | | | | | | | | | | | | | | | |
| 6) | I0 | | | P3 | | | *P6* | | | | | | | | | | | | | | | | | | |
| 7) | I0 | | | P3 | | | P6 | | | | | | | | | | | | | | | | | | |
| 8) | I0 | | | P3 | | | P6 | | | *P9* | | | | | | | | | | | | | | | |
| 9) | I0 | | | P3 | | | P6 | | | P9 | | | *I12* | | | | | | | | | | | | |
| 10) | I0 | | | P3 | | | P6 | | | | | | I12 | | | *P15* | | | | | | | | | |
| 11) | I0 | | | P3 | | | | | | | | | I12 | | | P15 | | | *P18* | | | | | | |
| 12) | I0 | | | | | | | | | | | | I12 | | | P15 | | | P18 | | | | | | |
| 13) | I0 | | | | | | | | | | | | I12 | | | P15 | | | P18 | | | *P21* | | | |
| 14) | I0 | | | | | | | | | | | | I12 | *B13* | *B14* | P15 | | | P18 | | | P21 | | | |
| 15) | I0 | | | | | | | | | | | | I12 | B13 | B14 | P15 | *B16* | *B17* | P18 | *B19* | *B20* | P21 | *B22* | *B23* | |
| 16) | I0 | | | | | | | | | | | | I12 | B13 | B14 | P15 | B16 | B17 | P18 | B19 | B20 | P21 | B22 | B23 | *I24* |
| 17) | I0 | | | | | | | | | | | | I12 | B13 | B14 | P15 | B16 | B17 | P18 | B19 | B20 | P21 | B22 | B23 | I24 |
| 18) | ~~I0~~ | | | | | | | | | | | *B11* | ~~I12~~ | ~~B13~~ | ~~B14~~ | ~~P15~~ | ~~B16~~ | ~~B17~~ | ~~P18~~ | ~~B19~~ | ~~B20~~ | ~~P21~~ | ~~B22~~ | ~~B23~~ | ~~I24~~ |

METHOD AND SYSTEM FOR DVD SMOOTH SEARCH TRANSITIONS

RELATED APPLICATIONS

The present application is a continuation application of and claims the benefit of U.S. patent application Ser. No. 09/994,428, filed Nov. 26, 2001 now U.S. Pat. No. 7,221,851, entitled "METHOD AND SYSTEM FOR DVD SMOOTH SEARCH TRANSITIONS," naming James van Welzen, Brian Falardeau, and Jonathan White as inventors, assigned to the assignee of the present invention. That application is incorporated herein by reference in its entirety and for all purposes.

BACKGROUND OF THE INVENTION

The DVD (digital versatile disk) format was designed by various members of the consumer electronics industry as a means of storing high quality audio-video content (e.g., a feature length film) on a single disk. To facilitate such efficient storage, the DVD format uses contemporary compression technologies to reduce the sizes of the video and audio bit streams comprising the content.

The DVD format employs the ISO MPEG-2 standard to compress video. MPEG-2 represents video content as a compressed series of frames. Each frame is a rectangular array of picture elements (pixels) depicting the content at a particular instant in time. Thus, playback consists of decompressing and then displaying this series of frames.

In conventional DVD players, the playback of DVD content is typically implemented in one of three ways: using dedicated hardware, using a software implementation, or using a combination of software and hardware. The most common or conventional implementation takes the form of a consumer electronics components with limited resources targeted exclusively at DVD playback. Less common or conventional implementations take the form of PC-based implementations or game consoles (e.g., Sony PLAYSTATION2, Microsoft X-BOX, etc.) which, because they target multiple functions, tend to have more extensive resources.

The MPEG-2 video standard employs three types of compressed frames: intra-frames (I-frames), predictive frames (P-frames), and bi-directionally predictive frames (B-frames). I-frames have no dependencies. Thus, an I-frame is self-contained and includes all information necessary to reproduce the associated original frame. P-frames may have forward dependencies, i.e., a P-frame is not self-contained. It may re-use information from the preceding decompressed reference frame (where a reference frame is either an I-frame or another P-frame). Thus, a playback implementation must decode reference frame preceding a P-frame before it decodes the P-frame itself and must keep the preceding reference frame resident in memory throughout the decoding of a P-frame. For the B-frames, B-frames are not self-contained and may have forward and backward dependencies, such that it may reuse information from either the preceding or the subsequent decompressed reference frame. Thus, a playback implementation must decode the reference frames both preceding and following a B-frame before it decodes the B-frame itself and must keep both the preceding and subsequent reference frames resident in memory throughout the decoding of a B-frame.

Normally, a playback implementation maintains four frame buffers (i.e., arrays of memory) of MPEG-2 video at any one time: 1) the currently decoded frame; 2) a forwards reference; 3) a backwards reference; and 4) the currently displayed frame. The forwards reference is the reference preceding the currently decoded frame, which is sometimes co-incident with the currently displayed frame. The backwards reference is the reference following the currently decoded frame. Additionally, the currently displayed frame is distinct from the currently decoded frame to prevent the player from updating a frame while it is being displayed, which causes an undesirable visual artifact called "tearing".

Conventional DVD players have limited memory resources to reduce cost and enable forwards playback at normal speeds. However, the memory resources are insufficient for many fast-forwarding and rewinding operations. For example, conventional DVD players avoid decoding P or B frames when playing backwards, and instead only decode the self-contained I-frames. This leads to decoding less than 10% of the frames and providing jerky, low frame-rate play.

SUMMARY OF THE INVENTION

Accordingly, a need exists for improved video playback when performing fast-forwarding and rewinding operations. Embodiments of the present invention provide novel solutions to these needs and others as described below.

Embodiments of the present invention are directed to methods, systems and computer-readable medium for changing video playback speed. More specifically, video playback speed may be changed by determining a first frame rate and a second frame rate for which a frame rate transition is to be made. An instantaneous frame rate is calculated to produce a calculated instantaneous frame rate, wherein the calculated instantaneous frame rate is between the first frame rate and the second frame rate. A timestamp of a frame is adjusted based on the calculated instantaneous frame rate to produce an adjusted timestamp. Graphical data for the frame is provided in accordance with the adjusted timestamp to enable display of the frame. Thereafter, the frame may be displayed in accordance with the adjusted timestamp.

In one embodiment, the playback may comprise a smooth search transition (e.g., forward, backward, etc.). With the use of adjusted timestamps, the video playback appears as a smooth increase or decrease in playback speed (e.g., without the "jerk" associated with conventional systems) when transitioning between speeds (e.g., 0.5×, 1×, 2×, 4×, 8×, etc.).

BRIEF DESCRIPTION OF THE DRAWINGS

The present invention is illustrated by way of example, and not by way of limitation, in the figures of the accompanying drawings and in which like reference numerals refer to similar elements.

FIG. 2 illustrates an example of I-, P-, and B-frames representing an original sequence of 24 frames in accordance with one embodiment of the present invention.

FIG. 4 illustrates an example step-by-step reconstruction diagram for the original sequence of frames in accordance with one embodiment of the present invention.

DETAILED DESCRIPTION OF THE INVENTION

Figure 1:
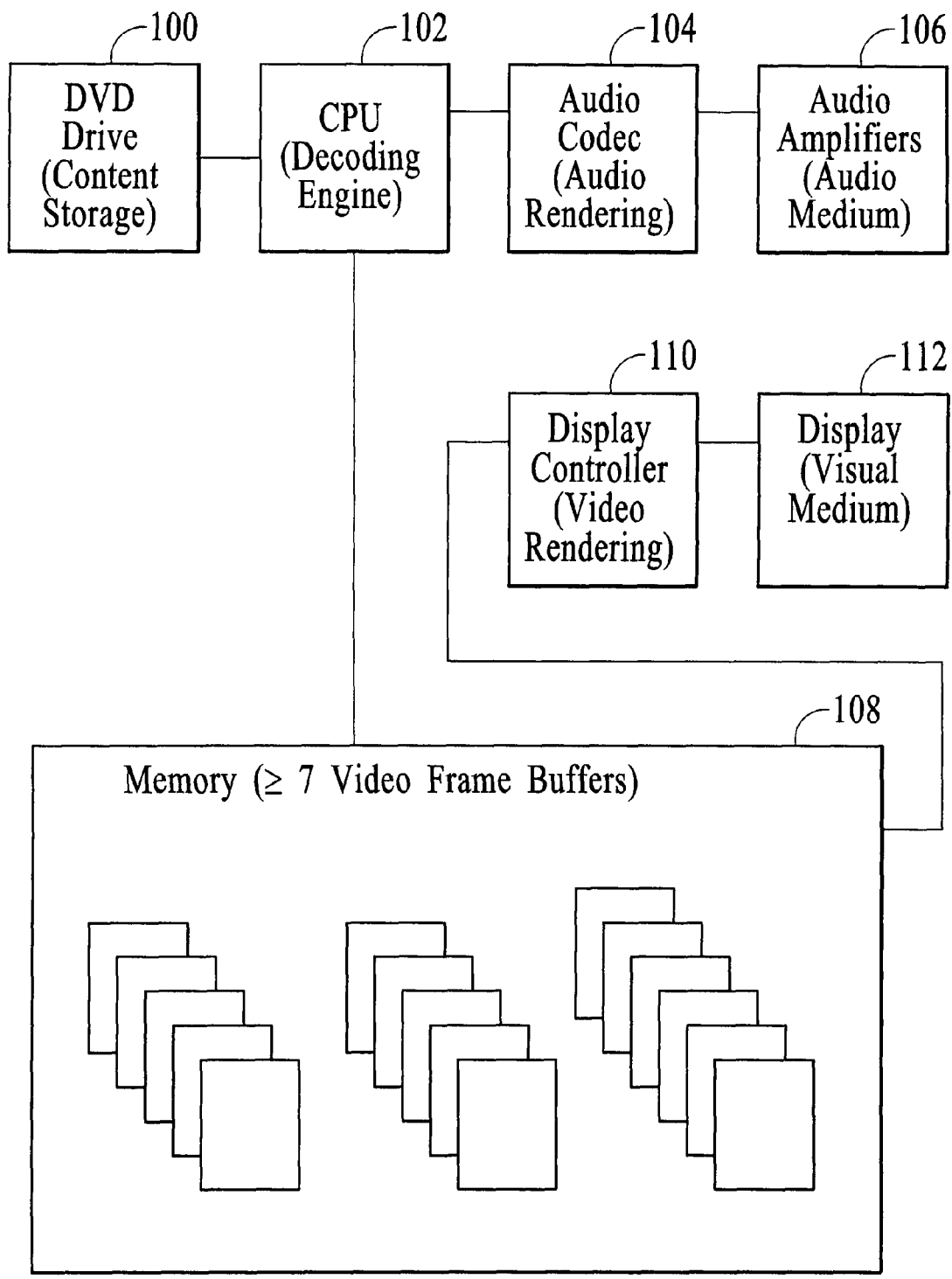
FIG. 1 illustrates a block diagram of a DVD player system with at least seven frame buffers in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "accepting," "accessing," "adding," "adjusting," "analyzing," "applying," "assembling," "assigning," "calculating," "capturing," "combining," "comparing," "collecting," "controlling," "creating," "defining," "depicting," "determining," "displaying," "distinguishing," "establishing," "executing," "generating," "grouping," "identifying," "modifying," "moving," "outputting," "performing," "placing," "presenting," "processing," "programming," "providing," "querying," "removing," "repeating," "sampling," "sorting," "storing," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

EMBODIMENTS OF THE INVENTION

The present invention provides aspects of displaying additional types of frames (e.g., in addition to I-frames) during the backwards playback in a DVD player. These aspects include smooth rewind, single frame stepping backwards, and smooth search transitions. FIG. 1 illustrates a block diagram of a DVD player system for implementing the aspects of the present invention. Actual implementations of this DVD player include but are not limited to PC-based DVD players and game console-based DVD systems (e.g., Sony PLAYSTATION, Microsoft X-BOX, etc.). As shown in FIG. 1, the DVD player system includes a DVD drive (content storage) 100, a decoding engine 102 (e.g., a CPU, etc.) for performing the processing of the present invention, an audio codec (audio rendering) 104, audio amplifiers (audio medium) 106, Memory 108 (e.g., comprising at least 7 video frame buffers), display controller (video rendering) 110, and a display (visual medium) 112. In one embodiment, the at least 7 frame buffers are allocated either from system memory or the video memory of any resident graphics hardware, as is well appreciated by those skilled in the art.

Smooth Rewind

Figure 3:
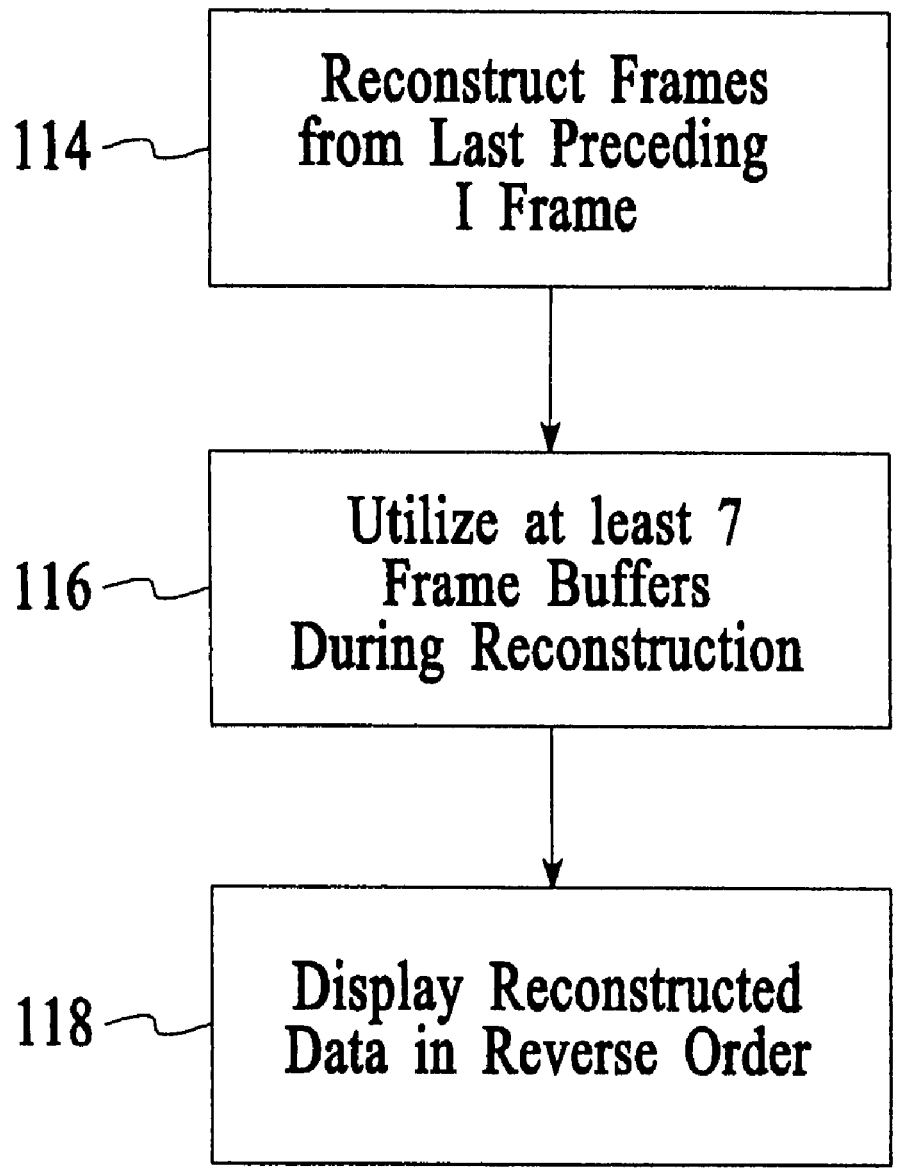
FIG. 3 illustrates a block flow diagram for smooth reverse playback in the DVD player system in accordance with one embodiment of the present invention.

The DVD standard for the operation of the DVD player system prescribes that I-frames occur no less frequently than every 12 frames, as demonstrated by an example sequence of 24 original frames shown in FIG. 2. In accordance with the present invention, smooth backwards playback of such a sequence occurs as described with reference to the overall block flow diagram of FIG. 3 and the step-by-step reconstruction diagram of FIG. 4. Referring to FIG. 3, to provide for the reverse playback from a currently displayed frame, reconstruction occurs from a last I-frame preceding a currently displayed frame to the frame immediately preceding the currently displayed frame (step 114). The process further includes utilizing at least 7 frame buffers to support the reconstruction (step 116). The data is displayed from memory in reverse order to provide a smooth playback of all the frames (step 118).

By way of example, for the process of FIG. 3, a sequence of 24 original frames, as shown in FIG. 2, is reconstructed as demonstrated by the step-by-step diagram of FIG. 4. In the diagram of FIG. 4, at each step, a decode is begun on a frame indicated in italicized type with the decode completed at the start of a next frame decode, a frame indicated in boldfaced type is displayed, and a frame indicated with strikethrough type is released from memory. Frame numbers indicated in normal type are held in memory.

In the example of FIG. 4, the process of reverse playback begins with a first frame I24, as the one immediately preceding a currently displayed frame. The I-frame preceding I24 is determined to be I12, which is shown as being decoded in step 1). With I12 decoded in step 2), it is able to provide the reference data for the frame P15, which starts its decode. With P15 decoded in step 3), it is able to provide the reference data for the frame P18, which starts its decode. In step 4), P18 is decoded and provides the reference data necessary for starting the decode of frame P21. In step 5), the data needed for frame I24 is present and its decode is started. Continuing with step 6), the I24 frame is displayed, and its data, together with the data from P21, provides the needed reference data to begin the decode of frame B23. Thus, in step 7), the decoded B23 data is displayed and the decode of B22 begins. With B22 decoded and displayed in step 8), the memory for B23 and I24 data is released, since neither will be used in any further decode. Further, since the next preceding frame P21 is already decoded, a next preceding I-frame, 10, is located and decoded in step 8). The data decoded for P21 is displayed in step 9), while the decode for the B20 frame is begun and the memory for B22 is released. In step 10), B20 is displayed while the decode of B19 is begun. In step 11), B19 is displayed, the memory for B20 and P21 is released, and the decode of P3 is begun. In step 12), P18 is displayed, the decode of B17 is begun, and the memory for B19 is released. With B17 decoded, it is displayed in step 13), while the decode of B16 begins. The decoded B16 is displayed in step 14), allowing the release of memory for its reference P18.

Also in step 14), the memory for B17 is released and the decode of P6 is begun. In step 15), P15 is displayed, the decode for B14 is begun, and the memory for B16 is released. Once decoded, B14 is displayed in step 16), and the decode for B13 is begun. B13 is then displayed in step 17), the memory for B14 and P15 is released, and the decode of P9 occurs. In step 18), I12 is finally displayed, the memory for B13 is released, and the decode of B11 begins.

The process demonstrated by FIG. 4 is cyclic. Thus, continuing with steps 19-30 would repeat steps 7-18 except on differently numbered frames, where the indices for the frame number are decremented by 12 every cycle. Further, in each step of the diagram, only 7 frames of data is stored in memory in one embodiment. For example, in step 1), only one buffer is allocated to store I12. In step 4), four buffers are allocated to store I12, P15, P18, and P21. In step 10), seven buffers are allocated to store 10, I12, P15, P18, B19, B20, and P21. Thus, the reconstruction for backwards playback need not use more than seven frame buffers during any one step in one embodiment. Of course, more buffers could be used in other embodiments. The decode process of the present invention may operate on sets of 12 frames (e.g., in accordance with the DVD standard which prescribes that I-frames occur no less frequently than every 12 frames). At a high level, the player appears to decode the sets in reverse order. At a low level, the player decodes each frame within a set in forwards order, which computationally is well within the existing capacity of a DVD player system, as represented in FIG. 1.

Single Frame Stepping Backwards

Figure 5:
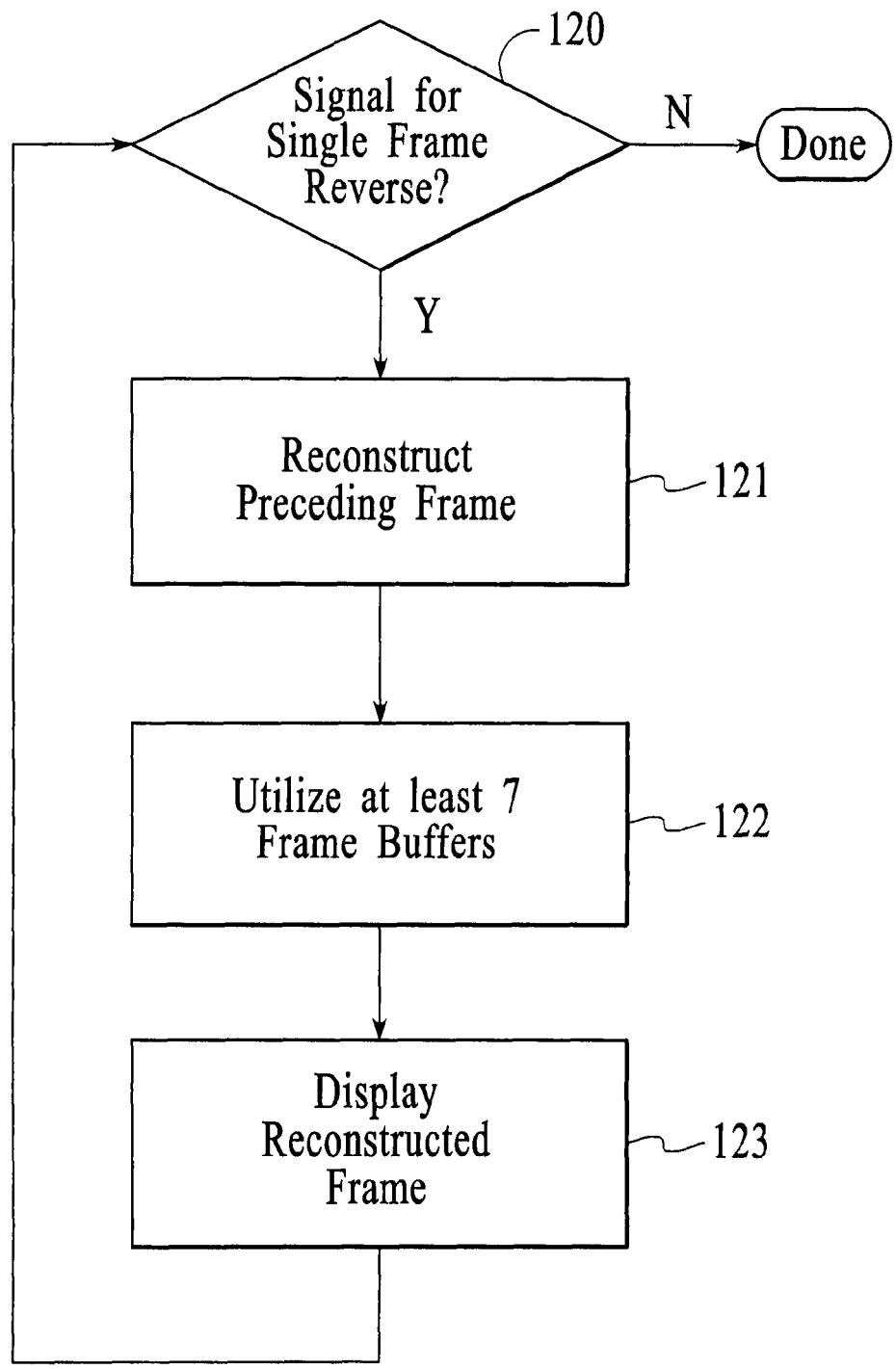
FIG. 5 illustrates a block flow diagram for a single frame backwards playback in accordance with one embodiment of the present invention.

In a further aspect, the reverse playback is modified to allow the DVD player system to display one frame at a time in reverse order. The implementation occurs as described above for smooth rewind, with the following differences, as shown in FIG. 5. The DVD player system waits for a signal from the user to step the frame backward (step 120) before starting the reconstruction of a preceding frame (step 121). The data is stored utilizing one of at least seven frame buffers (step 122). Once reconstructed, the frame is displayed (step 123) and the process returns to step 120 to await another signal indicating selection for single frame reverse.

Smooth Search Transitions

In yet another embodiment, the present invention provides for smooth search transitions in a DVD player system (e.g., transitions between one playback rate and another with reduced jerk). The limited frame rates of some displays, such as televisions, force DVD players to make the transition between one display rate and another abruptly. However, the frame rates of PC displays, for example, are flexible and thus, a PC-based DVD player system can make the transition between display rates smoothly. Thus, the aspect of smooth search transitions preferably is utilized in a DVD player system that provides data to displays that do not have limited frame rates.

In order to achieve smooth transition between display rates, the present invention linearly interpolates between one rate and another over a brief transition interval. Thus, with a given starting rate (r0), a new rate (r1), the time the player is aware of the eminent transition (t0), and the time of the scheduled transition (t1), the transition interval is defined to be the time between t0 and t1+(t1−t0), which provides a sufficient interval to maintain the overall average rate and in turn keeps audio and video in synchronization in one embodiment. A parametric equation R(t) is defined for the rate over the interval where the parametric u varies from 0 to 1, where 0 represents t0 and 1 represents t1+(t1−t0).

$$U = (now - t0)/(t1 - t0)$$

$$R(t) = r0 + u(r1 - r0)$$

Figure 6:
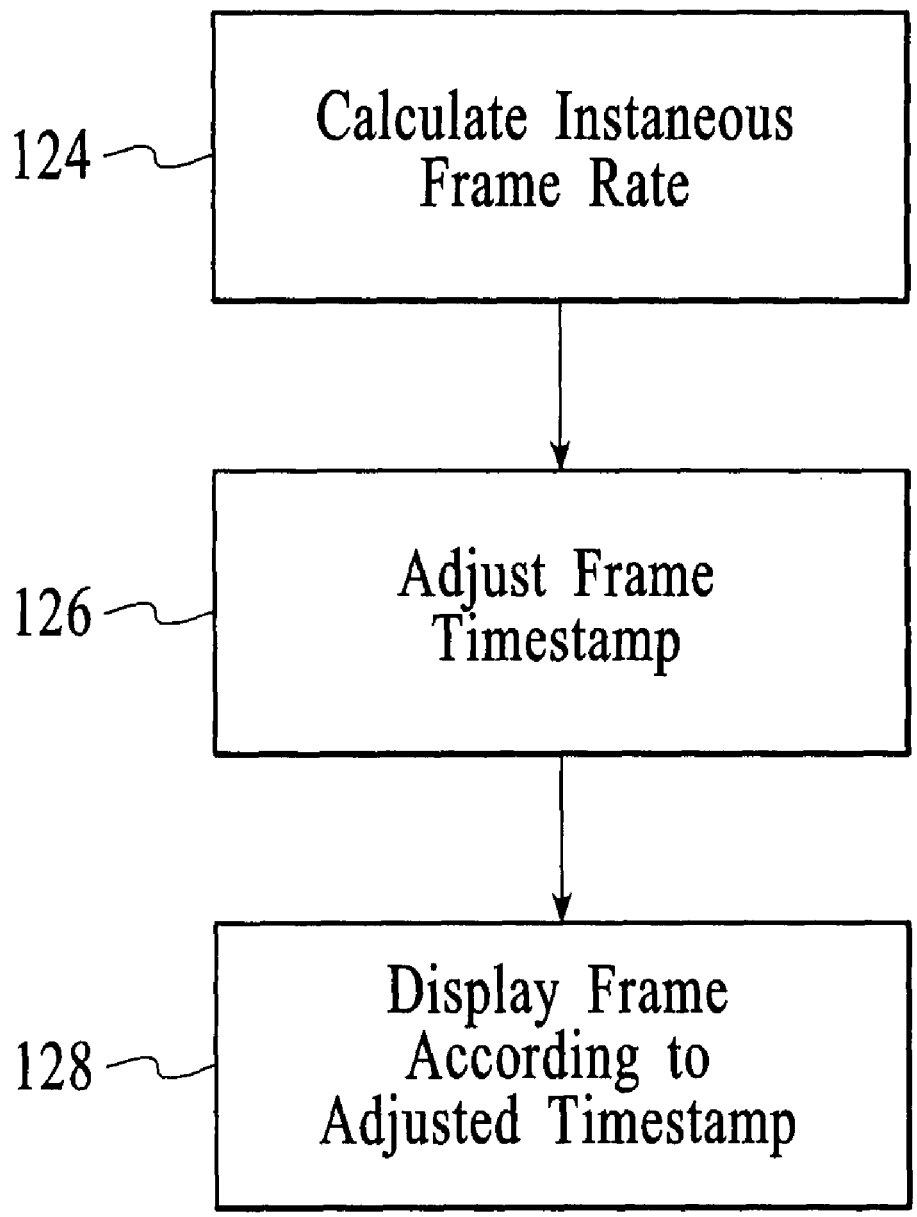
FIG. 6 illustrates a block flow diagram for smooth frame search transitions in accordance with one embodiment of the present invention.

FIG. 6 illustrates a block flow diagram for performing smooth search transitions. As shown in FIG. 6, an instantaneous rate is calculated for every frame using the frame's original timestamp as input (e.g., the "now" variable above) (step 124). The resulting rate is then used to calculate an adjusted timestamp for the frame (step 126). The frame is then displayed according to the adjusted timestamp (step 128). Thus, when the frames are provided with the adjusted timestamps, video playback appears as a smooth increase or decrease in playback speed (e.g., without the "jerk" associated with conventional systems) when transitioning between speeds (e.g., 0.5×, 1×, 2×, 4×, 8×, etc.).

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of changing video playback speed, said method comprising:
    determining a first frame rate and a second frame rate for which a frame rate transition is to be made;
    calculating an instantaneous frame rate to produce a calculated instantaneous frame rate, wherein said calculated instantaneous frame rate is between said first frame rate and said second frame rate;
    adjusting a timestamp of a frame based on said calculated instantaneous frame rate to produce an adjusted timestamp; and
    providing graphical data for said frame in accordance with said adjusted timestamp to enable display of said frame.

2. The method of claim 1 further comprising:
    displaying said frame in accordance with said adjusted timestamp.

3. The method of claim 1, wherein said calculating further comprises:
    determining a change in rate between said first frame rate and said second frame rate.

4. The method of claim 1, wherein said calculated instantaneous frame rate comprises a linear interpolation associated with said first and second frame rates.

5. The method of claim 1 further comprising:
    determining a transition interval for said frame rate transition.

6. The method of claim 5, wherein said transition interval comprises an interval sufficient to maintain audio synchronization.

7. The method of claim 5, wherein said transition interval comprises an interval sufficient to maintain video synchronization.

8. A system comprising a processor and a memory, wherein said processor is coupled to said memory, and wherein said memory comprises instructions that when executed on said processor implement a method for changing video playback speed, said method comprising:
    determining a first frame rate and a second frame rate for which a frame rate transition is to be made;
    calculating an instantaneous frame rate to produce a calculated instantaneous frame rate, wherein said calculated instantaneous frame rate is between said first frame rate and said second frame rate;

adjusting a timestamp of a frame based on said calculated instantaneous frame rate to produce an adjusted timestamp; and providing graphical data for said frame in accordance with said adjusted timestamp to enable display of said frame.

9. The system of claim 8 further comprising:

a display for displaying said frame in accordance with said adjusted timestamp.

10. The system of claim 8, wherein said processor comprises a decoding engine.

11. The system of claim 8, wherein said calculating further comprises:

determining a change in rate between said first frame rate and said second frame rate.

12. The system of claim 8, wherein said method further comprises:

determining a transition interval for said frame rate transition.

13. The system of claim 12, wherein said transition interval comprises an interval sufficient to maintain audio synchronization.

14. The system of claim 12, wherein said transition interval comprises an interval sufficient to maintain video synchronization.

15. A computer-readable medium comprising instructions for causing a system to perform a method of changing video playback speed, said method comprising:

determining a first frame rate and a second frame rate for which a frame rate transition is to be made;

calculating an instantaneous frame rate to produce a calculated instantaneous frame rate, wherein said calculated instantaneous frame rate is between said first frame rate and said second frame rate;

adjusting a timestamp of a frame based on said calculated instantaneous frame rate to produce an adjusted timestamp; and providing graphical data for said frame in accordance with said adjusted timestamp to enable display of said frame.

16. The computer-readable medium of claim 15, wherein said method further comprises:

displaying said frame in accordance with said adjusted timestamp.

17. The computer-readable medium of claim 15, wherein said calculating further comprises:

determining a change in rate between said first frame rate and said second frame rate.

18. The computer-readable medium of claim 15, wherein said method further comprises:

determining a transition interval for said frame rate transition.

19. The computer-readable medium of claim 18, wherein said transition interval comprises an interval sufficient to maintain audio synchronization.

20. The computer-readable medium of claim 18, wherein said transition interval comprises an interval sufficient to maintain video synchronization.

\* \* \* \* \*